United States Patent
Huang et al.

(10) Patent No.: US 9,703,155 B2
(45) Date of Patent: Jul. 11, 2017

(54) MANUFACTURE METHOD OF COLOR FILTER, COLOR FILTER AND LIQUID CRYSTAL DISPLAY PANEL

(71) Applicant: Shenzhen China Star Optoelectronics Technology Co., Ltd., Guangdong (CN)

(72) Inventors: Shishuai Huang, Guangdong (CN); Shih-Hsun Lo, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 83 days.

(21) Appl. No.: 14/407,177

(22) PCT Filed: Oct. 16, 2014

(86) PCT No.: PCT/CN2014/088721
§ 371 (c)(1),
(2) Date: Dec. 11, 2014

(87) PCT Pub. No.: WO2016/054834
PCT Pub. Date: Apr. 14, 2016

(65) Prior Publication Data
US 2016/0103355 A1 Apr. 14, 2016

(30) Foreign Application Priority Data
Oct. 11, 2014 (CN) .......................... 2014 1 0534282

(51) Int. Cl.
G02F 1/1343 (2006.01)
G02B 5/22 (2006.01)
(Continued)

(52) U.S. Cl.
CPC ......... *G02F 1/13439* (2013.01); *G02B 5/201* (2013.01); *G02B 5/22* (2013.01);
(Continued)

(58) Field of Classification Search
CPC .. G02B 6/0066; G02B 6/0025; G02F 1/13318
See application file for complete search history.

(56) References Cited

U.S. PATENT DOCUMENTS

| | | | | |
|---|---|---|---|---|
| 6,099,993 | A | * | 8/2000 | Kim ....................... G02B 5/201 349/106 |
| 2008/0182184 | A1 | * | 7/2008 | Zhan ..................... G02F 1/1343 430/7 |

(Continued)

FOREIGN PATENT DOCUMENTS

| | | |
|---|---|---|
| CN | 101013174 | 8/2007 |
| CN | 103257476 | 8/2013 |
| JP | 05-157907 | 6/1993 |

*Primary Examiner* — Sang V Nguyen

(57) ABSTRACT

The present invention provides a manufacture method of the color filter, comprising: sequentially deposing a metal layer and a black matrix layer on a substrate; implementing a patterning process to the black matrix layer with a half tone mask; removing the metal layer in the color filter area and the black matrix layer in the through hole area; coating a RGB color filter layer in the color filter area; deposing a transparent metal layer on the substrate to form a transparent electrode. The present invention improves the display quality of the liquid crystal display panels.

14 Claims, 5 Drawing Sheets

(51) Int. Cl.
*G02F 1/1335* (2006.01)
*G02B 5/20* (2006.01)
(52) U.S. Cl.
CPC .. *G02F 1/133512* (2013.01); *G02F 1/133514* (2013.01); *G02F 1/133516* (2013.01)

(56) References Cited

U.S. PATENT DOCUMENTS

| | | | | |
|---|---|---|---|---|
| 2010/0261096 | A1* | 10/2010 | Kageyama | G03F 7/70791 430/5 |
| 2011/0031517 | A1* | 2/2011 | Huang | H01L 29/78633 257/98 |
| 2011/0080542 | A1* | 4/2011 | Huang | G02F 1/136209 349/106 |
| 2013/0128194 | A1* | 5/2013 | Liao | G02F 1/13452 349/106 |
| 2014/0077171 | A1* | 3/2014 | Yamakita | G02B 5/201 257/40 |
| 2014/0168541 | A1* | 6/2014 | Zhao | G02F 1/13338 349/12 |
| 2014/0299472 | A1* | 10/2014 | Chang | B01L 3/502792 204/452 |
| 2014/0347610 | A1* | 11/2014 | Han | G02B 5/201 349/106 |
| 2015/0338692 | A1* | 11/2015 | Yu-Jin | G02F 1/13306 349/33 |

* cited by examiner

MANUFACTURE METHOD OF COLOR FILTER, COLOR FILTER AND LIQUID CRYSTAL DISPLAY PANEL

RELATED APPLICATIONS

This application is a National Phase of PCT Patent Application No. PCT/CN2014/088721 having International filing date of Oct. 16, 2014, which claims the benefit of priority of Chinese Patent Application No. 201410534282.3 filed on Oct. 11, 2014. The contents of the above applications are all incorporated by reference as if fully set forth herein in their entirety.

BACKGROUND OF THE INVENTION

1. Field of the Invention

The present invention generally relates to a display field, and more particularly to a manufacture method of a color filter, the color filter and a liquid crystal display panel.

2. Description of Prior Art

A liquid crystal display panel comprises an array substrate, a color filter and a liquid crystal layer positioned between the array substrate and the color filter.

The array substrate comprises data lines, scan lines, pixel electrodes (i.e. transparent electrodes), thin film transistors and an array substrate common electrode. The color filter comprises a black matrix, RGB color filters and a color filter common electrode (also transparent electrode). Storage capacitors are formed between the array substrate common electrode of the non active area of the liquid crystal display panel and the pixel electrodes. Liquid crystal capacitors are formed between the color filter common electrodes and the pixel electrodes.

When the liquid crystal display panel proceeds normal display, the voltage of the color filter common electrode can easily influenced by the data signals on the data lines and the scan signals on the scan lines. Meanwhile, the resistance of the color filter common electrode is larger. Therefore, the stability of the common voltage at the common electrode of the of the color filter is worse to lead to that the bias voltage of the liquid crystal molecules in the liquid crystal layer is instable and the display quality of the liquid crystal display panel descends.

Therefore, there is a need to provide a manufacture method of a color filter, the color filter and a liquid crystal display panel for solving the aforesaid existing issue in prior arts.

SUMMARY OF THE INVENTION

An objective of the present invention is to provide a manufacture method of a color filter, the color filter and a liquid crystal display panel which are capable of preferably releasing the common voltage at the common electrode of the color filter to resolve the technical issue of unstable bias voltage of the liquid crystal molecules in the liquid crystal layer caused by the worse stability of the common voltage at the common electrode of the of the color filter and the liquid crystal display panel according to prior arts.

For solving the aforesaid issue, the present invention provides the following technical solution:

the embodiment of the present invention provides a manufacture method of the color filter, comprising:
  sequentially deposing a metal layer and a black matrix layer on a substrate, and the substrate comprises a color filter area, a black matrix area and a through hole area;
  implementing a patterning process to the black matrix layer with a half tone mask to entirely remove the black matrix layer in the color filter area, to partially remove the black matrix layer in the through hole area, and to entirely reserve the black matrix layer in the black matrix area;
  removing the metal layer in the color filter area and the black matrix layer in the through hole area to form a black matrix and a through hole;
  coating a RGB color filter layer in the color filter area to form a RGB color filter; and
  deposing a transparent metal layer on the substrate to form a transparent electrode.

In the manufacture method of the color filter of the present invention, the step of removing the metal layer in the color filter area and the black matrix layer in the through hole area comprises:
  removing the metal layer in the color filter area by a wet etching method.

In the manufacture method of the color filter of the present invention, the step of removing the metal layer in the color filter area and the black matrix layer in the through hole area comprises:
  removing the black matrix layer in the through hole area by a dry etching method to form the black matrix and the through hole.

In the manufacture method of the color filter of the present invention, the transparent electrode is connected to the metal layer via the through hole.

In the manufacture method of the color filter of the present invention, the black matrix area encircles the through hole area.

In the manufacture method of the color filter of the present invention, the through hole area of the substrate is positioned between the RGB color filters of the same color.

In the manufacture method of the color filter of the present invention, the through hole area of the substrate is positioned between the RGB color filters of different colors.

The present invention further provides a color filter, comprising:
  a substrate, comprising a color filter area, a black matrix area and a through hole area;
  a RGB color filter, positioned in the color filter area;
  a metal layer, positioned in the black matrix area and the through hole area of the substrate;
  a black matrix, positioned on the metal layer in the black matrix area; and
  a transparent electrode, positioned on the RGB color filter, the metal layer in the through hole area and the black matrix.

In the color filter of the present invention, the black matrix area encircles the through hole area.

In the color filter of the present invention, the transparent electrode is connected to the metal layer via the through hole.

In the color filter of the present invention, the through hole area of the substrate is positioned between the RGB color filters of the same color.

In the color filter of the present invention, the through hole area of the substrate is positioned between the RGB color filters of different colors.

The present invention further provides a liquid crystal display panel, comprising an array substrate, a color filter and a liquid crystal layer positioned between the array substrate and the color filter;
  wherein the color filter comprises:

a substrate, comprising a color filter area, a black matrix area and a through hole area;

a RGB color filter, positioned in the color filter area;

a metal layer, positioned in the black matrix area and the through hole area of the substrate;

a black matrix, positioned on the metal layer in the black matrix area; and a transparent electrode, positioned on the RGB color filter, the metal layer in the through hole area and the black matrix.

In the liquid crystal display panel of the present invention, the black matrix area encircles the through hole area.

In the liquid crystal display panel of the present invention, the transparent electrode is connected to the metal layer via the through hole.

In the liquid crystal display panel of the present invention, the through hole area of the substrate is positioned between the RGB color filters of the same color.

In the liquid crystal display panel of the present invention, the through hole area of the substrate is positioned between the RGB color filters of different colors.

Compared with the color filter and the liquid crystal display panel according to prior arts, the manufacture method of a color filter, the color filter and the liquid crystal display panel of the present invention are capable of rapidly releasing the electric charges accumulated at the transparent electrode of the color filter (the common electrode of the color filter) by connecting the transparent electrode of the color filter and the metal layer via the through hole for making the bias voltage of the liquid crystal molecules in the liquid crystal layer stable to improve the display quality of the liquid crystal display panel; the technical issue of unstable bias voltage of the liquid crystal molecules in the liquid crystal layer caused by the worse stability of the common voltage at the common electrode of the of the color filter and the liquid crystal display panel according to prior arts can be solved.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In figures, the elements with similar structures are indicated by the same number.

Figure 1:
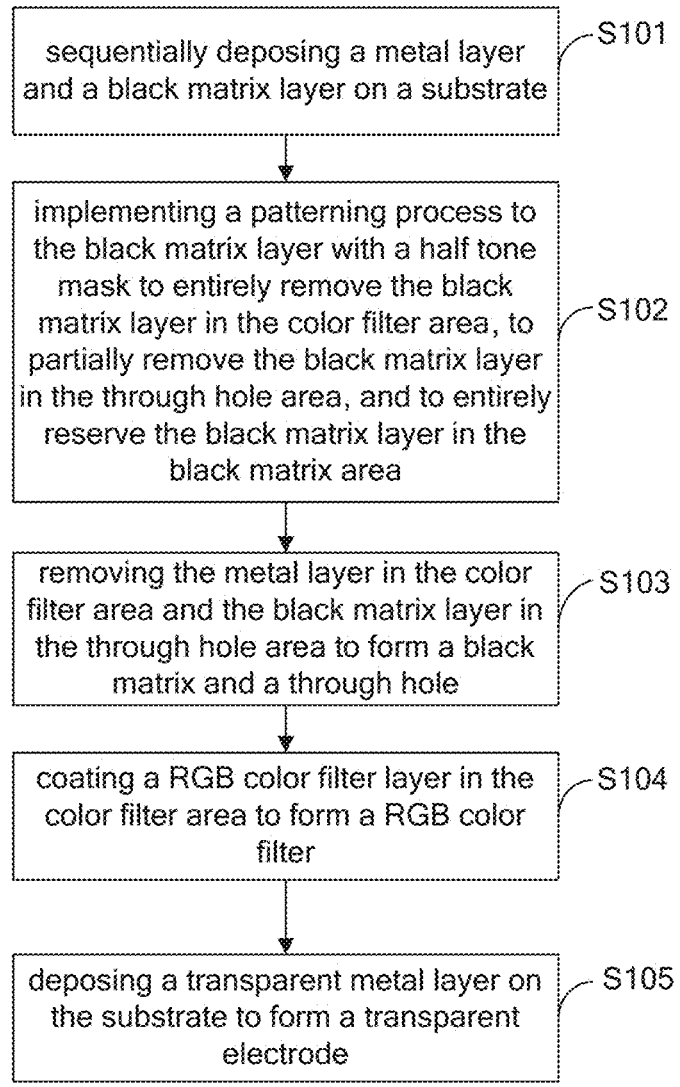
FIG. 1 depicts a flowchart of a manufacture method of a color filter according to the preferred embodiment of the present invention.

The present invention provides a manufacture method of the color filter. Please refer to FIG. 1, FIG. 2A to FIG. 2G. FIG. 1 depicts a flowchart of a manufacture method of a color filter according to the preferred embodiment of the present invention. FIG. 2A to FIG. 2G are structural diagrams of a manufacture method of a color filter according to the preferred embodiment of the present invention.

The manufacture method of a color filter according to the preferred embodiment comprises:

Step S101, sequentially depositing a metal layer and a black matrix layer on a substrate, and the substrate comprises a color filter area, a black matrix area and a through hole area;

Step S102, implementing a patterning process to the black matrix layer with a half tone mask to entirely remove the black matrix layer in the color filter area, to partially remove the black matrix layer in the through hole area, and to entirely reserve the black matrix layer in the black matrix area;

Step S103, removing the metal layer in the color filter area and the black matrix layer in the through hole area to form a black matrix and a through hole;

Step S104, coating a RGB color filter layer in the color filter area to form a RGB color filter; and Step S105, depositing a transparent metal layer on the substrate to form a transparent electrode.

The specific procedures of respective steps of the manufacture method of the color filter according to the preferred embodiment of the present invention are described below.

Figure 2A:
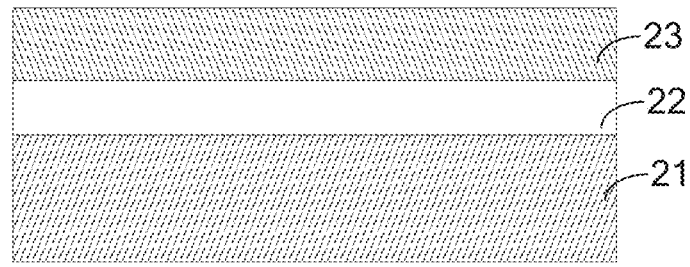
FIG. 2A to FIG. 2G are structural diagrams of a manufacture method of a color filter according to the preferred embodiment of the present invention.
Figure 2B:
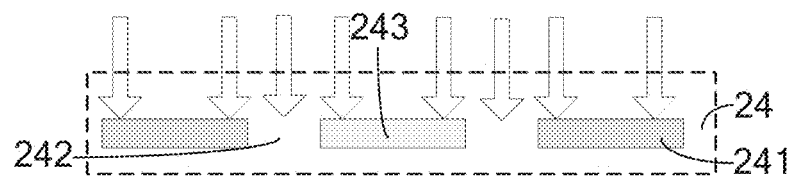
Figure 2B:
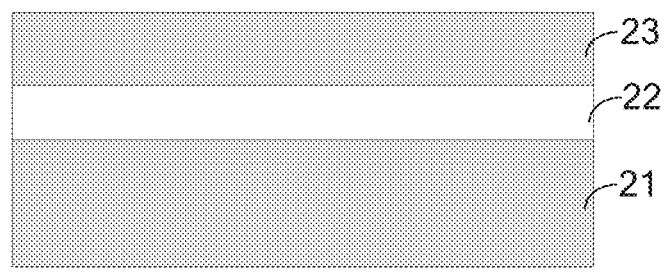

In the Step S101, a substrate 21, such as a glass substrate is provided. A metal layer 22 and a black matrix layer 23 are sequentially deposited on the substrate. The material of the metal layer 22 can be nobelium, molybdenum, aluminum, copper, titanium, tantalum, tungsten, et cetera. Specifically as shown in FIG. 2A, the substrate 21 comprises a color filter area employed for forming a RGB color filter 25, a black matrix area employed for forming a black matrix 26 and a through hole area employed for forming a through hole 27; for the transparent electrode 28 of preferably releasing the electric charges formed on the black matrix area, the through hole area of the substrate 21 is preferable to be positioned in the black matrix area, i.e. the black matrix area encircles the through hole area. Then, hereafter is the Step S102.

In the Step S102, a half tone mask 24 (HTM) is employed to implement a patterning process to the black matrix layer 23 (the half tone mask 24 is employed to implement exposure, development and photo resist stripping operations). The color filter area of the substrate 21 corresponds to the shielding area 241 of the half tone mask 24. The black matrix area of the substrate 21 corresponds to the full light transmittance area 242 of the half tone mask 24. The through hole area of the substrate 21 corresponds to the half light transmittance area 243 of the half tone mask 24. Please refer to FIG. 2B for the specific detail.

Figure 2C:
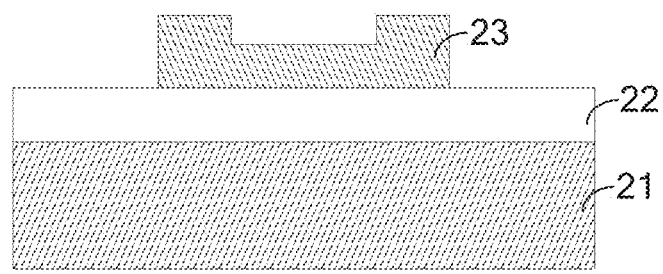

After the photo resist stripping operation, the black matrix layer 23 corresponding to the color filter area of the substrate 21 is entirely removed. The black matrix layer 23 in the through hole area of the substrate 21 is partially removed. The black matrix layer 23 in the black matrix area of the substrate 21 is entirely reserved. The specific detail is shown in FIG. 2C. Then, hereafter is the Step S103.

Figure 2D:
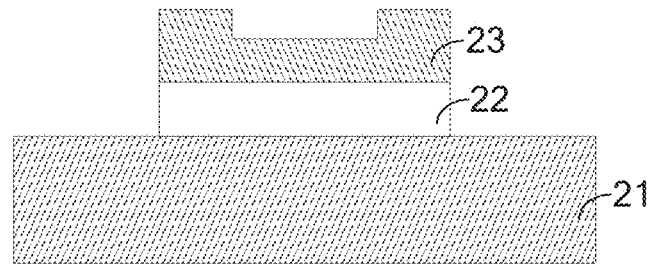
Figure 2E:
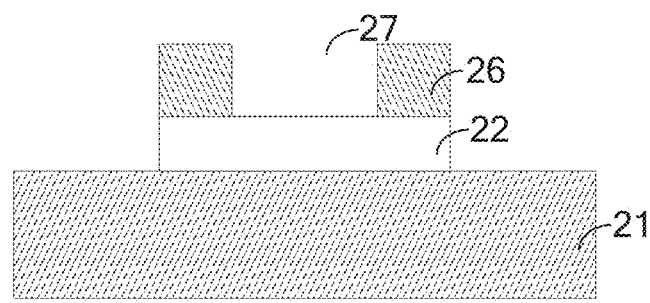

In the Step S103, the metal layer 22 corresponding to the color filter area of the substrate 21 and the black matrix layer 23 corresponding to the through hole area of the substrate 21 are removed to form a black matrix 26 and a through hole 27. Specifically, a wet etching method is employed to remove the metal layer 22 in the color filter area of the substrate 21. As shown in FIG. 2D, then, a dry etching method is employed to remove the black matrix layer 23 in the through hole area of the substrate 21 as shown in FIG. 2E. Thereby, the black matrix 26 and the through hole 27 can be formed on the metal layer 22. Then, hereafter is the Step S104.

Figure 2F:
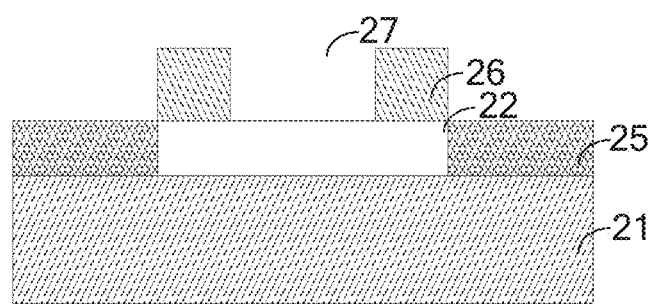

In the Step S104, a RGB color filter layer can be directly coated in the color filter area of the substrate because the metal layer 22 corresponding to the color filter area of the substrate 21 has been removed. Accordingly, a RGB color filter 25 is formed on the color filter area of the substrate 21 as shown in FIG. 2F. Then, hereafter is the Step S105.

Figure 2G:
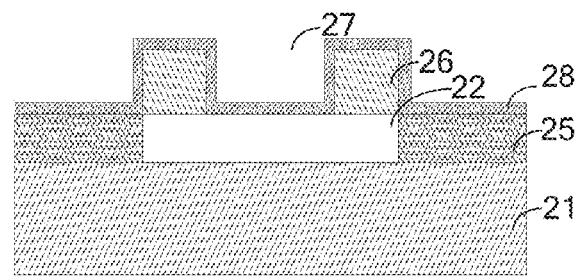

In the Step S105, a transparent metal layer is deposed on the color filter area, the black matrix area and the through hole area of the substrate 21. The transparent metal layer can be formed with ITO (indium-tin-oxide). Thereby, a transparent electrode 28 of the color filter is formed on the top of the substrate as shown in FIG. 2G. The transparent electrode 28 is connected to the metal layer 22 via the through hole 27.

Accordingly, the manufacture procedures of the color filter according to the preferred embodiment are accomplished.

The manufacture method of the color filter according to the preferred embodiment is capable of rapidly releasing the electric charges accumulated at the transparent electrode of the color filter (the common electrode of the color filter) by connecting the transparent electrode of the color filter and the metal layer via the through hole for making the bias voltage of the liquid crystal molecules in the liquid crystal layer stable to improve the display quality of the liquid crystal display panel.

The present invention further provides a color filter as shown in FIG. 2G. The color filter comprises a substrate 21, a RGB color filter 25, a metal layer 22, a black matrix 26 and a transparent electrode 28; the substrate comprises a color filter area, a black matrix area and a through hole area; the RGB color filter 25 is positioned in the color filter area of the substrate 21; the metal layer 22 is positioned in the black matrix area and the through hole area of the substrate 21; the black matrix 26 is positioned on the metal layer 22 in the black matrix area; the transparent electrode 28 is positioned on the RGB color filter 25, the metal layer 22 in the through hole area and the black matrix 26. The transparent electrode 28 is connected to the metal layer 22 via the through hole 27.

By connecting the transparent electrode 28 to the metal layer 22 via the through hole 27 in the preferred embodiment, the electric charges accumulated at the transparent electrode 28 of the color filter can he rapidly released to prevent the instability of the common voltage at the transparent electrode 28 of the color filter.

Figure 3:
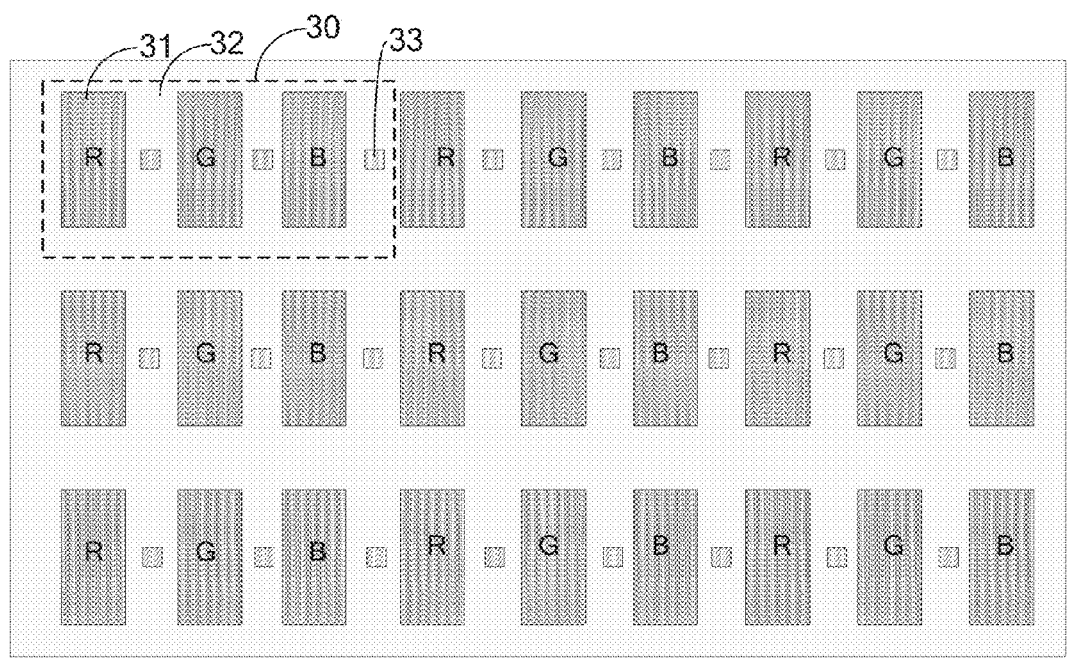
FIG. 3 is a structural diagram of a color filter according to the first preferred embodiment of the present invention.

Meanwhile, the black matrix area of the substrate 21 encircles the through hole area of the substrate 21. Please refer to FIG. 3. FIG. 3 is a structural diagram of a color filter according to the first preferred embodiment of the present invention. One pixel 30 of the color filter comprises three color filter areas 31 (which are a red color filter R, a green color filter G, a blue color filter B), a black matrix area 32 and three through hole areas 33. The through hole area 33 of the substrate is positioned between the RGB color filters (color filter area) of different colors. Accordingly, the transparent electrode of the through hole area 33 can uniformly release the electric charges of the corresponding pixel.

Figure 4:
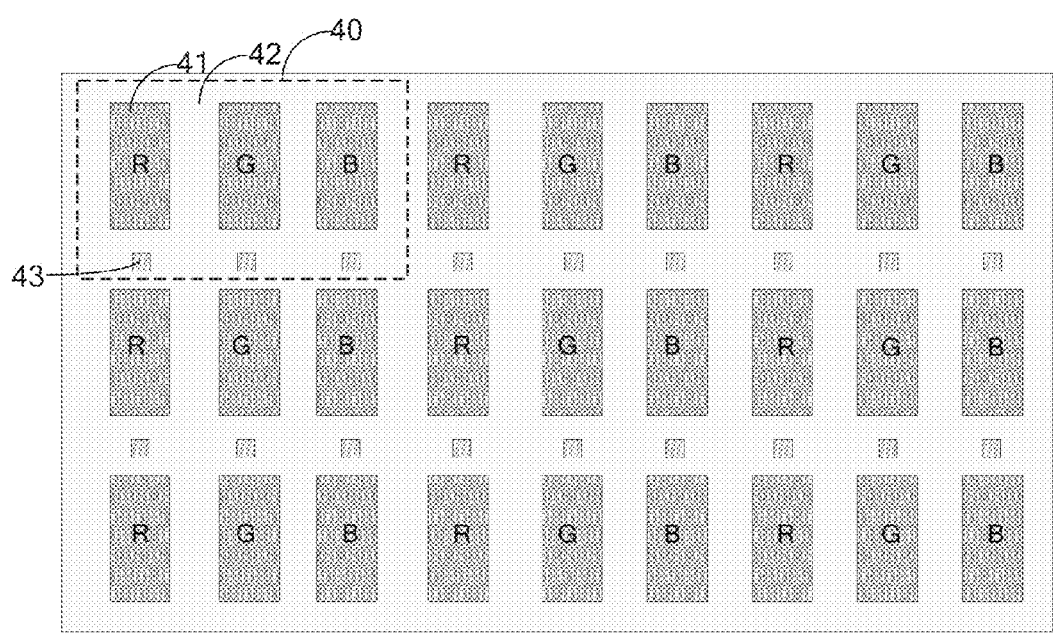
FIG. 4 is a structural diagram of a color filter according to the second preferred embodiment of the present invention.

Please refer to FIG. 4. FIG. 4 is a structural diagram of a color filter according to the second preferred embodiment of the present invention. One pixel 40 of the color filter also comprises three color filter areas 41 (which are a red color filter R, a green color filter G, a blue color filter B), a black matrix area 42 and three through hole areas 43. The through hole area 43 of the substrate is positioned between the RGB color filters (color filter area) of the same color. Similarly, the transparent electrode of the through hole area 43 can still uniformly release the electric charges of the corresponding pixel.

The color filter according to the preferred embodiment is capable of rapidly releasing the electric charges accumulated at the transparent electrode of the color filter (the common electrode of the color filter) by connecting the transparent electrode of the color filter and the metal layer via the through hole for making the bias voltage of the liquid crystal molecules in the liquid crystal layer stable to improve the display quality of the liquid crystal display panel.

The present invention further provides a liquid crystal display panel. The liquid crystal display panel comprises an array substrate, a color filter and a liquid crystal layer positioned between the array substrate and the color filter. The color filter comprises a substrate, a RGB color filter, a metal layer, a black matrix and a transparent electrode; the substrate comprises a color filter area, a black matrix area and a through hole area; the RGB color filter is positioned in the color filter area; the metal layer is positioned in the black matrix area and the through hole area of the substrate; the black matrix is positioned on the metal layer in the black matrix area; the transparent electrode is positioned on the RGB color filter, the metal layer in the through hole area and the black matrix.

Preferably, the black matrix area of the substrate of the color filter encircles the through hole area of the color filter in the liquid crystal display panel of the present invention.

Preferably, the through hole area of the substrate of the color filter is positioned between the RGB color filters of different colors in the liquid crystal display panel of the present invention.

Preferably, the through hole area of the substrate of the color filter is positioned between the RGB color filters of the same color in the liquid crystal display panel of the present invention.

The specific working principle of the liquid crystal display panel is the same or similar to that of the preferred embodiment of the aforesaid color filter. Please refer to the related description in the preferred embodiment of the aforesaid color filter for the specific detail.

The manufacture method of a color filter, the color filter and the liquid crystal display panel of the present invention are capable of rapidly releasing the electric charges accumulated at the transparent electrode of the color filter (the common electrode of the color filter) by connecting the transparent electrode of the color filter and the metal layer via the through hole for making the bias voltage of the liquid crystal molecules in the liquid crystal layer stable to improve the display quality of the liquid crystal display panel; the technical issue of unstable bias voltage of the liquid crystal molecules in the liquid crystal layer caused by the worse stability of the common voltage at the common electrode of the of the color filter and the liquid crystal display panel according to prior arts can be solved.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A manufacture method of a color filter, comprising:
sequentially depositing a metal layer and a black matrix layer on a substrate, and the substrate comprises a color filter area, a black matrix area and a through hole area;
implementing a patterning process to the black matrix layer with a half tone mask to entirely remove the black matrix layer in the color filter area, to partially remove the black matrix layer in the through hole area, and to entirely reserve the black matrix layer in the black matrix area;
removing the metal layer in the color filter area and the black matrix layer in the through hole area to form a black matrix and a through hole;
coating a RGB color filter layer in the color filter area to form an array of RGB color filters;
wherein the black matrix area includes an array of through holes, each is provided in between two adjacent RGB color filters; and
depositing a transparent metal layer on the substrate to form a transparent electrode;
wherein the black matrix of the black matrix area encircles the through hole area, and through the hole area of the structure is positioned in the black matrix area.

2. The manufacture method of the color filter according to claim 1, wherein the step of removing the metal layer in the color filter area and the black matrix layer in the through hole area comprises:
removing the metal layer in the color filter area by a wet etching method.

3. The manufacture method of the color filter according to claim 2, wherein the step of removing the metal layer in the color filter area and the black matrix layer in the through hole area comprises:
removing the black matrix layer in the through hole area by a dry etching method to form the black matrix and the through hole.

4. The manufacture method of the color filter according to claim 3, wherein the transparent electrode is connected to the metal layer via the through hole.

5. The manufacture method of the color filter according to claim 1, wherein the through hole area of the substrate is positioned between the RGB color filters of the same color.

6. The manufacture method of the color filter according to claim 1, wherein the through hole area of the substrate is positioned between the RGB color filters of different colors.

7. A color filter, comprising:
a substrate, comprising a color filter area, a black matrix area and a through hole area of an array of through hole areas;
an array of RGB color filters, positioned in the color filter area;
wherein each through hole area of the array of through hole areas is provided in between two adjacent RGB color filters;
a metal layer, positioned in the black matrix area and the through hole area of the substrate;
a black matrix, positioned on the metal layer in the black matrix area; and
a transparent electrode, positioned on the RGB color filter, the metal layer in the through hole area and the black matrix;
wherein the black matrix of the black matrix area encircles the through hole area, and the through hole area of the substrate is positioned in the black matrix area.

8. The color filter according to claim 7, wherein the transparent electrode is connected to the metal layer via the through hole.

9. The color filter according to claim 7, wherein the through hole area of the substrate is positioned between the RGB color filters of the same color.

10. The color filter according to claim 7, wherein the through hole area of the substrate is positioned between the RGB color filters of different colors.

11. A liquid crystal display panel, comprising an array substrate, a color filter and a liquid crystal layer positioned between the array substrate and the color filter;
wherein the color filter comprises:
a substrate, comprising a color filter area, a black matrix area and a through hole area of an array of through hole areas;
an array of RGB color filters, positioned in the color filter area;
wherein the black matrix area includes an array of through holes, each is provided in between two adjacent RGB color filters;
a metal layer, positioned in the black matrix area and the through hole area of the substrate;
a black matrix, positioned on the metal layer in the black matrix area; and
a transparent electrode, positioned on the RGB color filter, the metal layer in the through hole area and the black matrix;
wherein the black matrix of the black matrix area encircles the through hole area, and the through hole area of the substrate is positioned in the black matrix area.

12. The liquid crystal display panel according to claim 11, wherein the transparent electrode is connected to the metal layer via the through hole.

13. The liquid crystal display panel according to claim 11, wherein the through hole area of the substrate is positioned between the RGB color filters of the same color.

14. The liquid crystal display panel according to claim 11, wherein the through hole area of the substrate is positioned between the RGB color filters of different colors.

* * * * *